United States Patent
Chou (10) Patent No.: US 7,929,425 B1
(45) Date of Patent: Apr. 19, 2011

(54) RESOURCE RESERVATION PROTOCOL—TRAFFIC ENGINEERING WITH ADAPTIVE HOT REDUNDANCY

(75) Inventor: Li-Peng Chou, Saratoga, CA (US)

(73) Assignee: ANDA Networks Inc., Sunnyvale, CA (US)

( * ) Notice: Subject to any disclaimer, the term of this patent is extended or adjusted under 35 U.S.C. 154(b) by 175 days.

(21) Appl. No.: 12/040,184

(22) Filed: Feb. 29, 2008

(51) Int. Cl.
*H04L 1/00* (2006.01)

(52) U.S. Cl. .......................... 370/221; 370/241; 370/248

(58) Field of Classification Search .................. 709/224, 709/225, 231; 370/219, 221, 241, 248
See application file for complete search history.

(56) References Cited

U.S. PATENT DOCUMENTS

| | | | |
|---|---|---|---|
| 6,728,780 B1 * | 4/2004 | Hebert | 709/239 |
| 6,763,479 B1 * | 7/2004 | Hebert | 714/4 |
| 6,877,105 B1 * | 4/2005 | Watanabe et al. | 714/4 |
| 6,983,294 B2 * | 1/2006 | Jones et al. | 707/202 |
| 7,093,160 B2 * | 8/2006 | Lau et al. | 714/11 |
| 2002/0169794 A1 * | 11/2002 | Jones et al. | 707/204 |
| 2003/0046604 A1 * | 3/2003 | Lau et al. | 714/11 |
| 2004/0078619 A1 * | 4/2004 | Vasavada | 714/4 |
| 2005/0073998 A1 * | 4/2005 | Zhu et al. | 370/352 |
| 2005/0188248 A1 * | 8/2005 | O'Brien et al. | 714/5 |
| 2006/0083162 A1 * | 4/2006 | Gomez | 370/216 |
| 2007/0091911 A1 * | 4/2007 | Watanabe et al. | 370/408 |
| 2007/0183314 A1 * | 8/2007 | Li et al. | 370/217 |

* cited by examiner

*Primary Examiner* — William Trost, IV
*Assistant Examiner* — Emmanuel Maglo
(74) *Attorney, Agent, or Firm* — Shemwell Mahamedi LLP (57) ABSTRACT

A network interface device with resource reservation protocol-traffic engineering capability and improved hot redundancy. A first interface card is provided for receiving a request, which specifies a data session between two host devices in a network, from an adjacent node in the network, and for storing a session parameter based on the request. A standby interface card is provided for receiving a request from the active interface card, based on the request received by the active interface card, and for storing another session parameter, concurrently with a storing of the session parameter by the active interface card, based on the request. Failure detection circuitry is provided for detecting a failure within the active interface card, and for coupling the second interface card to the adjacent node depending on whether or not a failure is detected.

42 Claims, 8 Drawing Sheets

RESOURCE RESERVATION PROTOCOL—TRAFFIC ENGINEERING WITH ADAPTIVE HOT REDUNDANCY

TECHNICAL FIELD

The disclosure herein relates generally to data transfers within network systems, and more specifically to maintaining data sessions within networks systems employing resource reservation protocol-traffic engineering.

BACKGROUND

Resource reservation protocol-traffic engineering (RSVP-TE) is a transport layer protocol standard used in many network systems to allow individual applications to receive different qualities of service (QoS) for respective data flows. For example, certain multimedia applications (e.g., Voice over IP, videoconferencing, etc.) may require a regular and continuous delivery of data. Such applications place a greater emphasis on the timeliness of the data delivery, and less emphasis on the reliability of such data delivery. On the other hand, more traditional applications (e.g., downloadable content) typically require reliable data delivery, with less regard as to when or how often each data packet is delivered.

In the past, data paths in a network were typically configured and torn down manually. For example, a user would specify which nodes in the network were to form the data path, and then manually allocate resources within each node (e.g., according to QoS requirements). Furthermore, at the end of a data session, the user would then perform a manual reallocation of the resources (i.e., "tear down" the data path). However, RSVP-TE works by dynamically "reserving" and maintaining appropriate resources (e.g., according to application-specific QoS requirements) in each node along a data transmission path. RSVP-TE automatically establishes a data path across one or more nodes in a network by enabling each individual node to communicate control information to one or more adjacent nodes.

Figure 1:
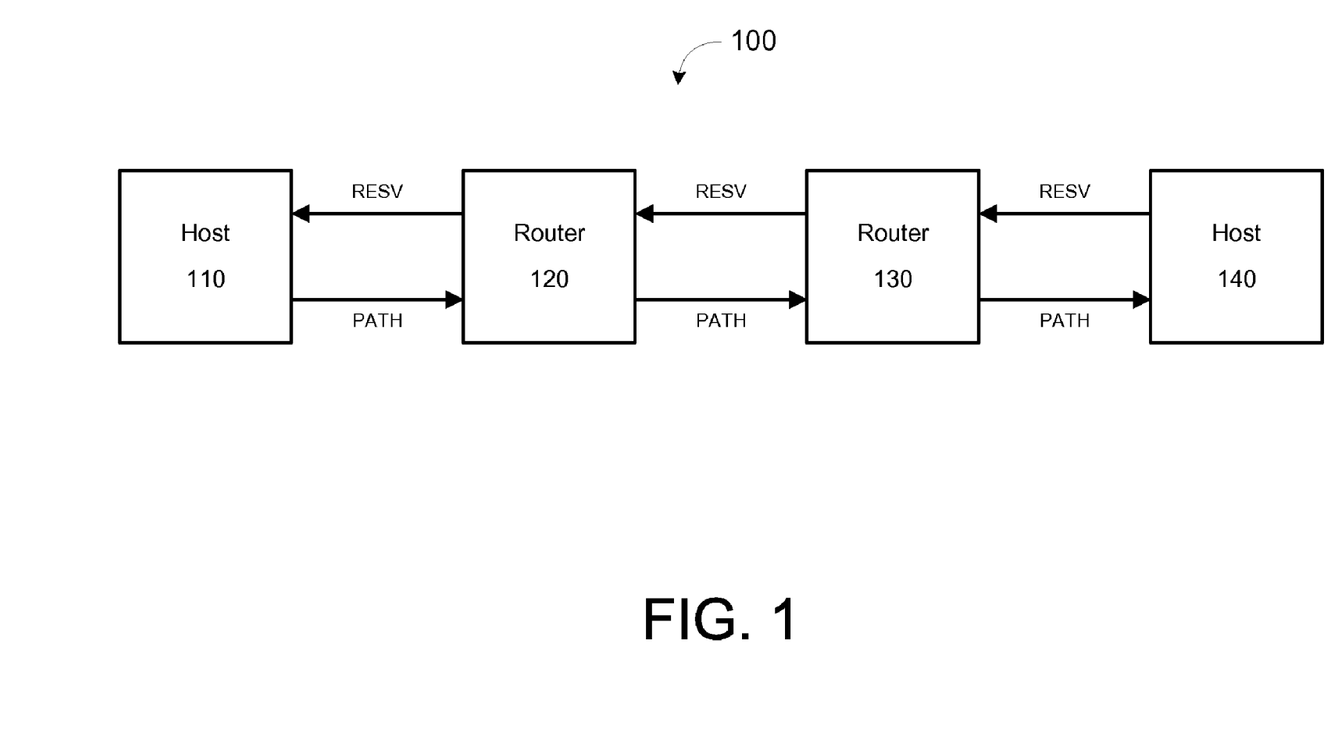
FIG. 1 illustrates a typical initialization of an RSVP-TE session within a network.

FIG. 1 illustrates a typical initialization of an RSVP-TE session within a network 100. The network 100 includes two host devices 110 and 140, as well as two routers 120 and 130. Suppose, in this example, host 110 wishes to establish a data session with host 140. Host 110 first sends a "path" request (PATH) to an adjacent node (router 120), using the internet protocol (IP) address of destination node (host 140) for routing purposes. For example, a routing protocol within host 110 may utilize a routing table (or look-up table) to determine which adjacent node to forward the PATH request to, based on the destination IP address. The PATH request includes information necessary to establish a data session between host 110 and host 140, including: the IP address of the previous node in the data path, the format of data packets to be sent, traffic characteristics of the data flow, and advertising information. Upon reception, router 120 stores a "path state," based on the PATH request, and then forwards the PATH request to the next node in the data path (router 130), based on the destination IP address. The stored path state will be used to trace the data path backwards, hop-by-hop, from host 140 to host 110, as is discussed in further detail below. Upon reception, router 130 also stores a path state and forwards the PATH request to the destination node (host 140), based on the destination IP address.

Once the PATH request is received by host 140, it too stores a path state based on the PATH request. Host 140 then reserves the appropriate resources needed to maintain the particular QoS, based on the request parameters. Host 140 then sends a "reservation" request (RESV) to the previous node in the data path (router 130), based on the stored path state. The RESV request identifies the resources to be reserved within each node, based on the particular QoS parameters. Router 130 then reserves the requested resources, in response to the RESV request from the host 140, and sends a RESV request to the previous node in the data path (router 120), based on the stored path state. Accordingly, router 120 reserves the requested resources, in response to the RESV request from router 130, and sends a RESV request to the source node (host 110), based on the stored path state. Finally, reception of the RESV request by host 110 indicates the establishment of a data session between host 110 and host 140. Host 110 may thus begin transmitting data packets to host 140.

In addition to the PATH and RESV requests described above, other forms of RSVP-TE messages may include, but are not limited to: PATH error, indicating an error encountered during the processing of a PATH request; RESV error, indicating an error encountered during the process of a RESV request; PATH tear, indicating a tear-down of a PATH session; RESV tear, indicating a tear-down of a RESV session; CONFIRM, confirming the success of a PATH request; and HELLO, initiating a RSVP-TE connection with a neighboring node.

Due to the dynamic nature in which RSVP-TE creates and maintains data paths, each node along the data path is established in a "soft state." Thus, each node is responsible for periodically "refreshing" its session status to neighboring nodes along the data path, as well as tearing down the session when a failure occurs. For example, refreshing may be accomplished by having each host or router along the data path periodically send a PATH or RESV request to its neighbors. In the event that a refresh is not received from a particular node, within an allotted amount of time (e.g., the "cleanup timeout" interval), it is assumed that a failure occurred within that node and the data session is subsequently torn down. Constantly tearing down and reconstructing data sessions is very inefficient, as the transfer of all data packets for the specific application cease for a period of time while a new data session is initialized (as in the example of FIG. 1). Thus, it is desirable to maintain a particular data session (once established) for as long as possible, by ensuring that each node sends out a refresh request before the cleanup timeout interval expires.

Figure 2:
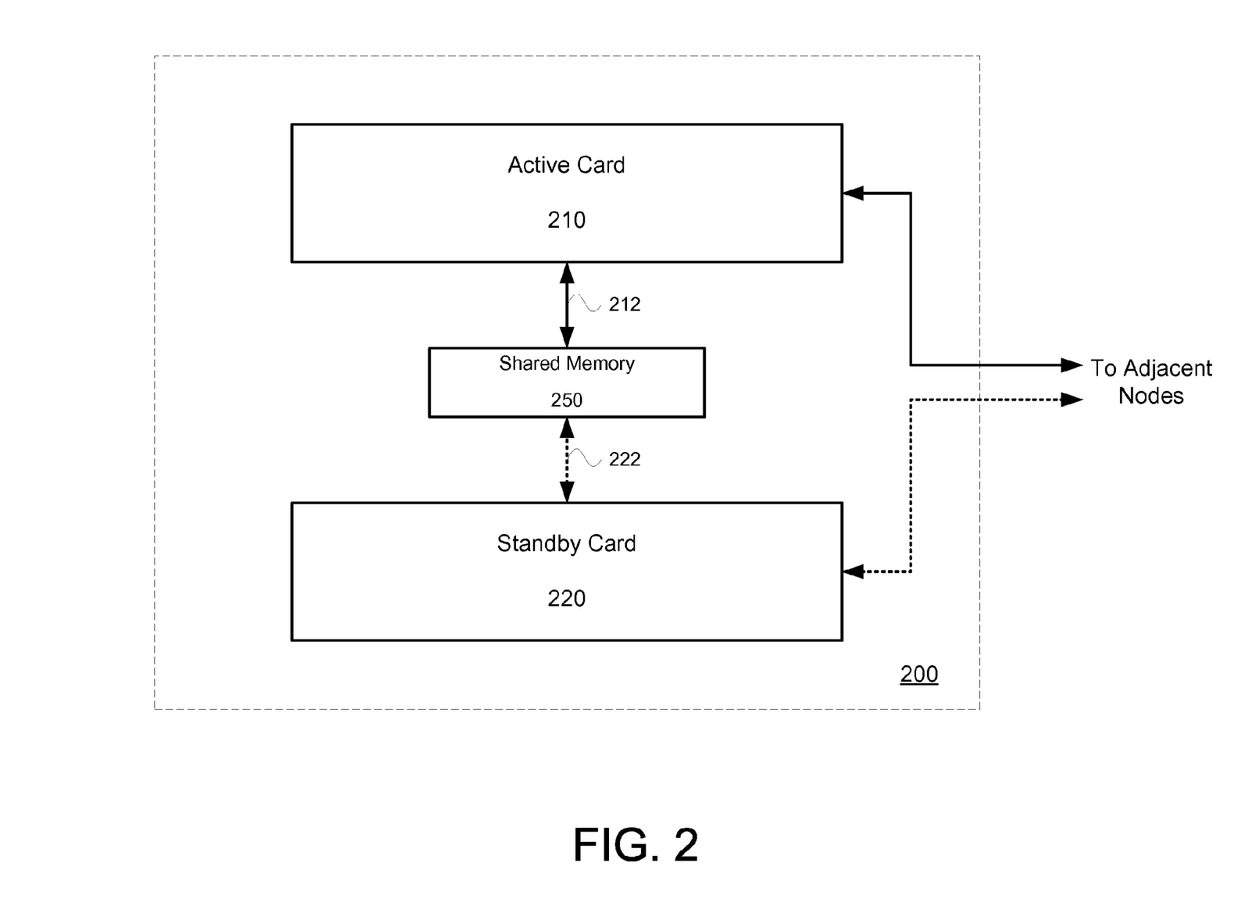
FIG. 2 illustrates a standard network interface device for use in a network which employs RSVP-TE.

FIG. 2 illustrates a standard network interface device 200 which may be used in a router having RSVP-TE functionality. The network interface device 200 includes an active interface card 210, a standby interface card 220, a shared memory 250, and two data buses 212 and 222. Both the active interface card 210 and the standby interface card 220 are coupled to send and receive RSVP-TE (e.g., PATH and RESV) requests from adjacent nodes along a data path. However, the standby card 220 is prevented from interfacing directly with the network as long as the active card 210 is functioning normally. The shared memory 250 is coupled to both the active card 210 and the standby card 220 via data buses 212 and 222, respectively, and is used for storing dynamic session information. For example, each time the active card 210 receives a PATH request from a previous node, it updates a path state stored in the shared memory 250 based on the PATH request. Similarly, the active card 210 updates one or more resource reservation parameters stored in the shared memory 250 each time a RESV request is received. Because the standby card 220 has access to the dynamic session information stored in the shared memory 250, it is able to immediately assume the role of the active card 210 in the event of a failure (e.g., the active card 210 is unable to send refresh requests to adjacent nodes). Thus, by switching to the "redundant" standby card 220, a data session need not be torn down and reconstructed in the event of a failure within the active card 210. This technique, known as "hot redundancy," allows data sessions to be maintained for extended periods of time.

One limitation of the network interface device 200 is that it requires a high level of hardware overhead. For example, the shared memory 250 is typically a dual port memory to allow access by both the active card 210 and the standby card 220. The communication links 212 and 222 are typically bi-directional data buses, to allow each of the active card 210 and the standby card 220 to store and retrieve data from the shared memory 250. A further limitation of the network interface device 200 is that the active card 210 and the standby card 220 are not allowed to access the shared memory 250 simultaneously, as doing so would significantly degrade the overall performance of the device 200. Thus, the standby card 220 is only allowed access to the shared memory 250 in the event of a failure in the active card 210. The standby card 220 then quickly processes the dynamic session information stored in the shared memory 250, in order to maintain the data session soft state for the current node, before the cleanup timeout interval expires. It is therefore desirable to achieve a network interface device with increased hot redundancy performance, while minimizing overall hardware overhead.

BRIEF DESCRIPTION OF THE DRAWINGS

The disclosure herein is illustrated by way of example, and not by way of limitation, in the figures of the accompanying drawings and in which like reference numerals refer to similar elements and in which.

DETAILED DESCRIPTION

In embodiments disclosed herein, a network interface device is provided for improved hot redundancy in RSVP-TE networks. In specific embodiments, a network interface device with adaptive hot redundancy is disclosed. In one network interface device embodiment, for example, a standby interface card is disclosed capable of adapting to changes in a dynamic session state by "snooping" in on RSVP-TE communications between an active interface card and one or more adjacent nodes. In other embodiments, a network interface device is provided with minimal hardware overhead. For purposes of discussion, the terms "data" and "data packets" are herein used interchangeably. A "failure" or "failure condition" represents a condition (typically within an active card) which restricts a network interface device from sending and/or receiving one or more RSVP-TE requests. Once established, a data session is said to be maintained by each participating network interface device in a "soft state," based on stored dynamic session state information, which may be modified and/or updated at any time within a data session interval. Furthermore, the term "concurrently" is herein used to describe two or more processes at least partially overlapping in time.

Figure 3:
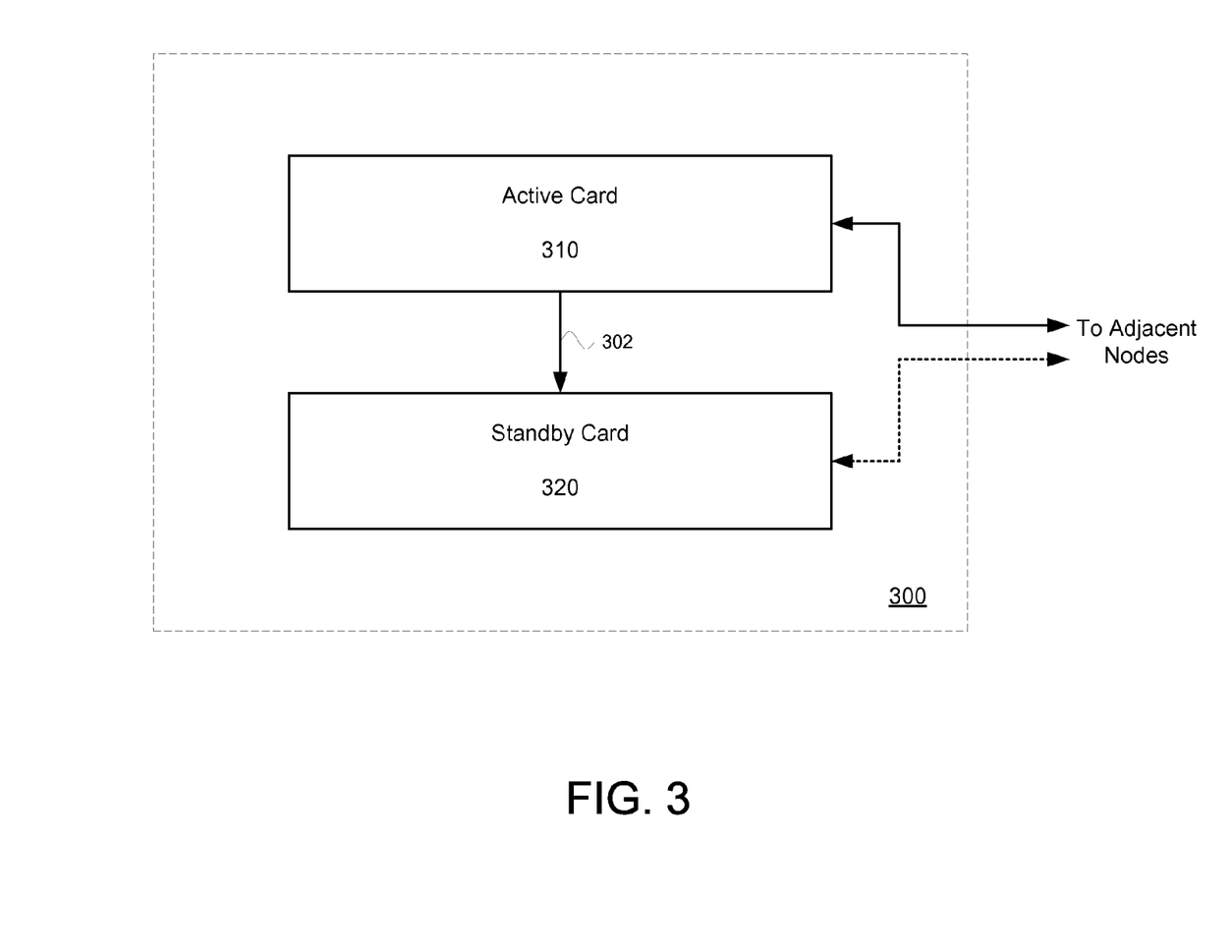
FIG. 3 illustrates a network interface device according to an embodiment.

FIG. 3 illustrates a network interface device 300 according to an embodiment. The network interface device 300 includes an active interface card 310 and a standby interface card 320 coupled via a communication link 302. Both the active interface card 310 and the standby interface card 320 are coupled to send and receive RSVP-TE (e.g., PATH and RESV) requests from adjacent nodes along a data path. The standby card 320 is prevented from interfacing directly with the network as long as the active card 310 is functioning normally. In other words, the physical layer of the communication links between the standby card 320 and one or more adjacent nodes is disabled, as long as no failure is detected within the active card 310. In an embodiment, the standby card 320 may be electrically decoupled from the network (e.g., via a switch or multiplexer) while the active card 310 assumes normal operation.

Instead of a shared memory, dynamic session state information is individually stored by each of the active card 310 and the standby card 320. The communication link 302 is provided for communicating RSVP-TE requests between the active card 310 and the standby card 320, such that the standby card 320 may replicate the dynamic session information stored in the active card 310. In an embodiment, all PATH and RESV requests received by the active card 310 are output to the standby card 320 as well, via the communication link 302. In another embodiment, all PATH and RESV requests output by the active card 310, to one or more adjacent nodes, are further copied and received by the standby card 320, via the communication link 302. For example, the communication link may be coupled between an interface circuit and a central processing unit (CPU), of the active card 310, such that the standby card 320 is able to tap (e.g., "snoop") in on all incoming and outgoing communications between the active card 310 and one or more adjacent nodes, without the active card's knowledge. This allows the standby card 320 to reconstruct the dynamic session information stored by the active card 310, and thus mirror, concurrently, a soft state of the active card 310 at any point in time. In the event of a failure in the active card 310, the standby card 320 may immediately (and seamlessly) assume the role of the active card 310 for purposes of transmitting, receiving, and/or processing RSVP-TE requests. Thus, hot redundancy may be achieved without requiring an expensive dual-port shared memory, as is employed in conventional systems.

In an embodiment, the communication link 302 is a standard unidirectional Ethernet cable. This enables the standby card 320 to receive a copy of all RSVP-TE requests send and received by the active card 310, while at the same time minimizing hardware overhead. Furthermore, this allows the standby card 320 to be "loosely coupled" to the active card 310, thus allowing the standby card 320 to be easily inserted or removed from the network interface device 300. In other words, the standby card 320 may be connected (e.g., "plugged in") to the network interface device 300 at any time during normal operation of the active card 310. However, in alternative embodiments, the communication link 302 may be a bi-directional Ethernet cable, thus allowing for a failed active card 310 to be easily replaced with a new standby card. For example, after the standby card 320 assumes the role of a failed active card 310, the failed active card 310 may be replaced with a new standby card, simply by "plugging in" the new standby card to the network interface device 300 (i.e., without any further modifications to the existing circuitry or architecture of the network interface device 300). As will be discussed in further detail below, the standby card 320 is able to reconstruct the dynamic session information of the active card 310 at any time, based on periodic refresh requests (e.g., PATH and RESV requests) sent to and received by the active card 310.

The foregoing embodiment of the network interface device 300 offers several advantages over the standard network interface device 200, described above in reference to FIG. 2. First, in the event of a failure in the active card 310, the standby card 320 is able to respond (i.e., assume the role of the active card 310) faster than the standby card 220 of FIG. 2. For example, the standby card 320 receives a copy of all RSVP-TE requests received by and sent from the active card 310, and is therefore able to reconstruct and maintain the same soft state, concurrently, with the active card 310. Thus, in the event of a failure, the standby card 320 is able to immediately assume the role of the active card 310 based on its own internally-stored dynamic session information, rather than having to reconstruct the session information in response to a failure. This allows for a much smoother transition from the active card 310 to the standby card 320.

Furthermore, the elimination of shared resources (i.e., shared memory 250, in reference to FIG. 2) also reduces the chances of a failure condition persisting after switching from the active card 310 to the standby card 320. For example, in reference to FIG. 2, if a failure in the network interface device 200 results from a hardware failure in the shared memory 250, the same hardware failure is likely to propagate to the standby card 220, when the standby card 220 is given access to the shared memory 250. Thus, such a failure condition would continue to persist regardless of whether the active card 210 or the standby card 220 is in control. In contrast, the network interface device 300 is more robust, and impervious to such failures.

Referring back to the embodiment of FIG. 3, rather than "share" the dynamic session state information of the active card 310, the standby card 320 actively reconstructs a copy of the dynamic session information based on the PATH and RESV requests that are sent to and received by the active card 310. Thus, the soft state maintained by the standby card 320 is typically an exact copy of the soft state maintained by the active card 310. At the same time, any hardware failures associated with the active card 310 will not adversely affect the ability of the standby card 320 to properly execute RSVP-TE requests.

Figure 4:
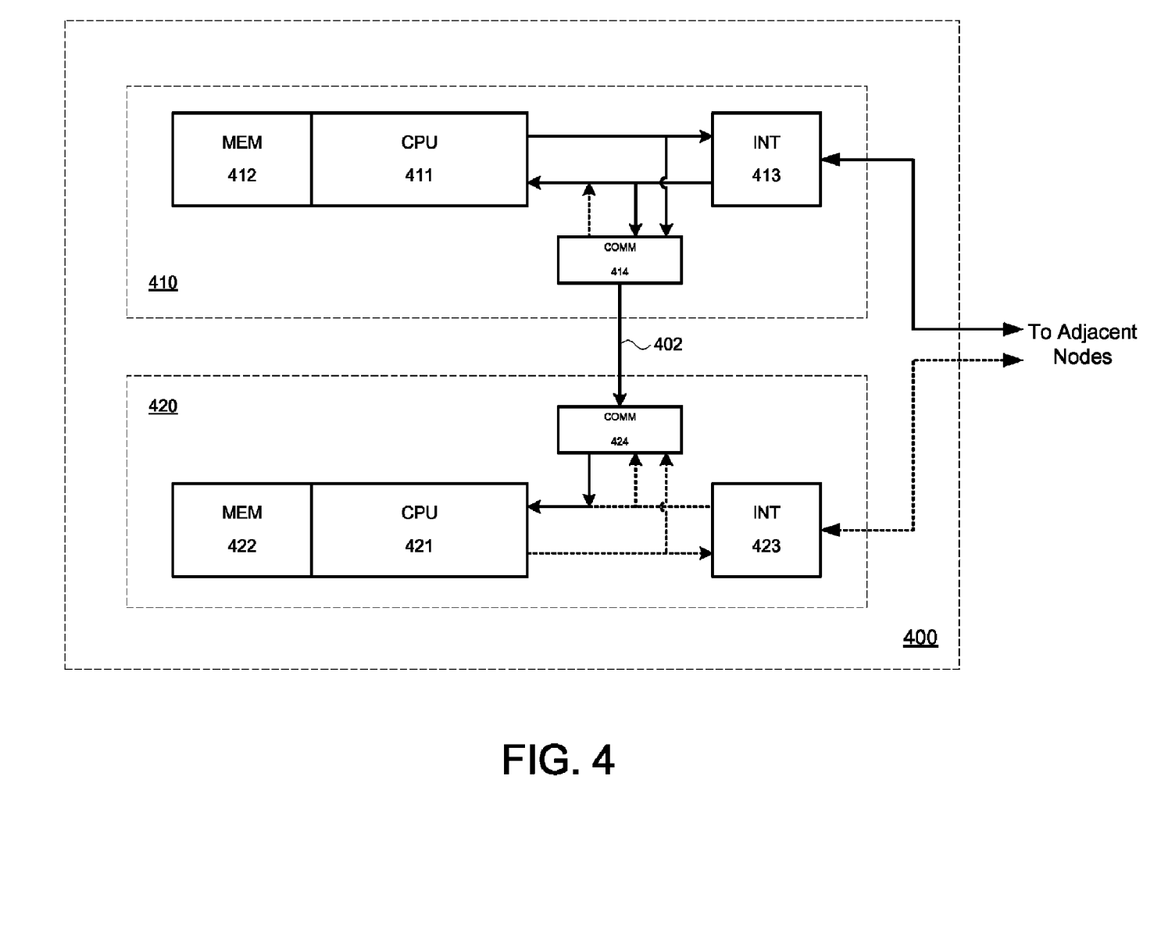
FIG. 4 illustrates a network interface device according to a more detailed embodiment.

FIG. 4 illustrates a network interface device 400 according to a more detailed embodiment, which may be used to implement the functionality described above, in reference to FIG. 3. The network interface device 400 includes an active interface card 410 and a standby interface card 420 coupled via a communication link 402. According to an embodiment, the communication link 402 is a standard unidirectional Ethernet cable, thus minimizing hardware overhead for the network interface device 400. According to an alternative embodiment, the communication link 402 may be a bi-directional Ethernet cable, allowing for a failed active card to be easily replaced with a new standby card.

The active interface card 410 is made up of a central processing unit (CPU) 411, a memory unit 412, an interface circuit 413, and a communication circuit 414 which acts as an interface between the communication link 402 and the active card 410. In an embodiment, the interface circuit 413 is coupled to a network, thus enabling communication of RSVP-TE (e.g., PATH and RESV) requests between the network interface device 400 and one or more adjacent nodes within the network. RSVP-TE requests received at the interface circuit 413 are subsequently passed on to the CPU 411 and the CPU 412 (e.g., via the communication channel, made up of elements 414, 402, and 424) for processing.

For example, upon reception of a PATH request, the CPU 411 may store a path state within the memory unit 412, based on the PATH request. In an embodiment, the stored path state may include, but is not limited to, information pertaining to: an IP address of the previous node along the data path (i.e., the node which sent the PATH request to the network interface device 400), the format of data packets to be sent (e.g., based on the type of application), traffic characteristics of the data flow, and/or advertising information. Furthermore, assuming the network interface device 400 is capable of routing the PATH request to its destination, the CPU 411 will thus establish a soft state for the network interface device 400. In an embodiment, the CPU 411 may additionally store the routing information (e.g., an IP address of the next node in the data path), once it is determined, to the memory unit 412. In response to a RESV request, assuming the network interface device 400 is capable of reserving the requested resources for the application, the CPU 411 may reserve the requested resources and update a dynamic session parameter stored in the memory unit 412.

The memory unit 412 is thus provided for storing the dynamic session information indicated above, and for maintaining a soft state of the network interface device 400. For example, the memory unit 412 may consist of one or more dynamic random access memory (DRAM) devices. However, other types of memory or storage circuits may be used in alternative embodiments.

The standby interface card 420 is made up of a CPU 421, a memory unit 422, an interface circuit 423, and a communication circuit 424 which acts as an interface between the communication link 402 and the standby card 420. The interface circuit 423 is coupled to the network, for enabling communication of RSVP-TE (e.g., PATH and RESV) requests between the network interface device 400 and one or more adjacent nodes within the network. However, according to an embodiment, the physical layer of the communication links between the interface circuit 423 and one or more adjacent nodes is disabled, as long as the active card 410 operates normally.

The CPU 421 is further coupled to receive RSVP-TE requests that are sent to and received by the active card 410, via the communication link 402. For example, each time a PATH or RESV request is provided to the CPU 411 (via the interface circuit 413) for processing, a copy of the request is provided to the CPU 421, via the communication link 402. According to an embodiment, the communication link 402 is coupled between the interface circuit 413 and the CPU 411 of the active card 410 in order to enable the CPU 421 to receive the RSVP-TE request, concurrently, with the CPU 411. In response, the CPU 421 either stores a path state, or reservation state, accordingly. In an embodiment, the CPU 421 operates concurrently with CPU 411 in processing incoming RSVP-TE requests received from one or more adjacent nodes. In other words, the CPU 421 actively constructs (or reconstructs) a soft state of the network interface device 400 based on the same RSVP-TE requests received by the CPU 411. Accordingly, the CPU 421 is able to maintain, concurrently, an exact copy (or at least a substantially similar copy) of the dynamic session states maintained by the counterpart CPU 411.

Thus, when a PATH or RESV request is provided from the CPU 411 (to be output to one or more adjacent nodes), a copy of the request is additionally provided to the CPU 421. The CPU 421 then determines whether or not to maintain a soft state for the network interface device 400, depending on whether or not the CPU 411 outputs a proper PATH or RESV request in response to the received RSVP-TE request. For example, the CPU 421 may determine whether or not to create a soft state if it receives a very first PATH request. On the other hand, the CPU 421 may determine whether or not to update or revise a soft state, if one has already been established for the network interface device 400. If the CPU 411 outputs a PATH request, the CPU 421 will establish a soft state as if it actually output the PATH request. Similarly, if the CPU 411 outputs a RESV request, the CPU 421 will update its reservation state as if it actually output the RESV request.

On the other hand, if the CPU 411 is not able to route the PATH request, it may instead output an error message to the sender of the PATH request (i.e., in the direction of the source host). Similarly, the CPU 411 may output an error message to the sender of a RESV request (i.e., in the direction of the destination host) if it is unable to reserve the requested resources. The error messages output by the CPU 411 are further copied and received by the CPU 421. In response to such an error message, the CPU 421 may subsequently tear down its soft state. In an embodiment, an error condition that is detected internally by the CPU 411 may be replicated to the CPU 421. For example, it may be desirable to provide the CPU 421 with all of the same (or at least substantially similar) information within the CPU 411, in order to enable the CPU 421 to make identical (or at least substantially similar) decisions with regard to the processing of RSVP-TE requests. On the other hand, if the error condition is received from an external packet (e.g., a RSVP-TE message received from an adjacent node), the CPU 411 will typically replicate the packet to the CPU 421, automatically.

The memory unit 422 is provided for storing the dynamic session information indicated above, for use in maintaining a soft state of the network interface device 400. For example, the memory unit 422 may be made up of a plurality of dynamic random access memory (DRAM) cells. However, other types of memory or storage circuits may be used in alternative embodiments.

It should be noted that the active interface card 410 and the standby interface card 420 may be identical, according to an embodiment. Thus, designation of the active card 410 and the standby card 420 may depend upon a direction of the communication link 402 (e.g., assuming a unidirectional communication link). For example, because RSVP-TE requests are typically communicated from the active card 410 to the standby card 420, the interface card that is on the receiving end of the communication link 402 may be automatically designated the standby interface card. Thus, an operational step of establishing a communication link between two interface cards coupled to the network interface device 400 may determine the assignment of the active interface card 410 and the standby interface card 420. Furthermore, when the standby card 420 assumes the role of an active card, a new standby card may be coupled to the old standby card 420 (i.e., in place of the failed active card 410) simply by reversing the direction of the communication link 402.

Accordingly, further to the dynamic session information indicated above, the memory unit 422 may also store the same static information (e.g., persistent database information) as the memory unit 412. Examples of such static information may include, but are not limited to: routing or forwarding tables, port assignments, provisioning information, and/or network management information. Although only the active card 410 and the standby card 420 are illustrated in FIG. 4, in other embodiments, the network interface device 400 may include additional components and/or circuitry for performing alternative tasks not shown (e.g., traffic policing, forwarding of data packets, etc.).

Figure 8:
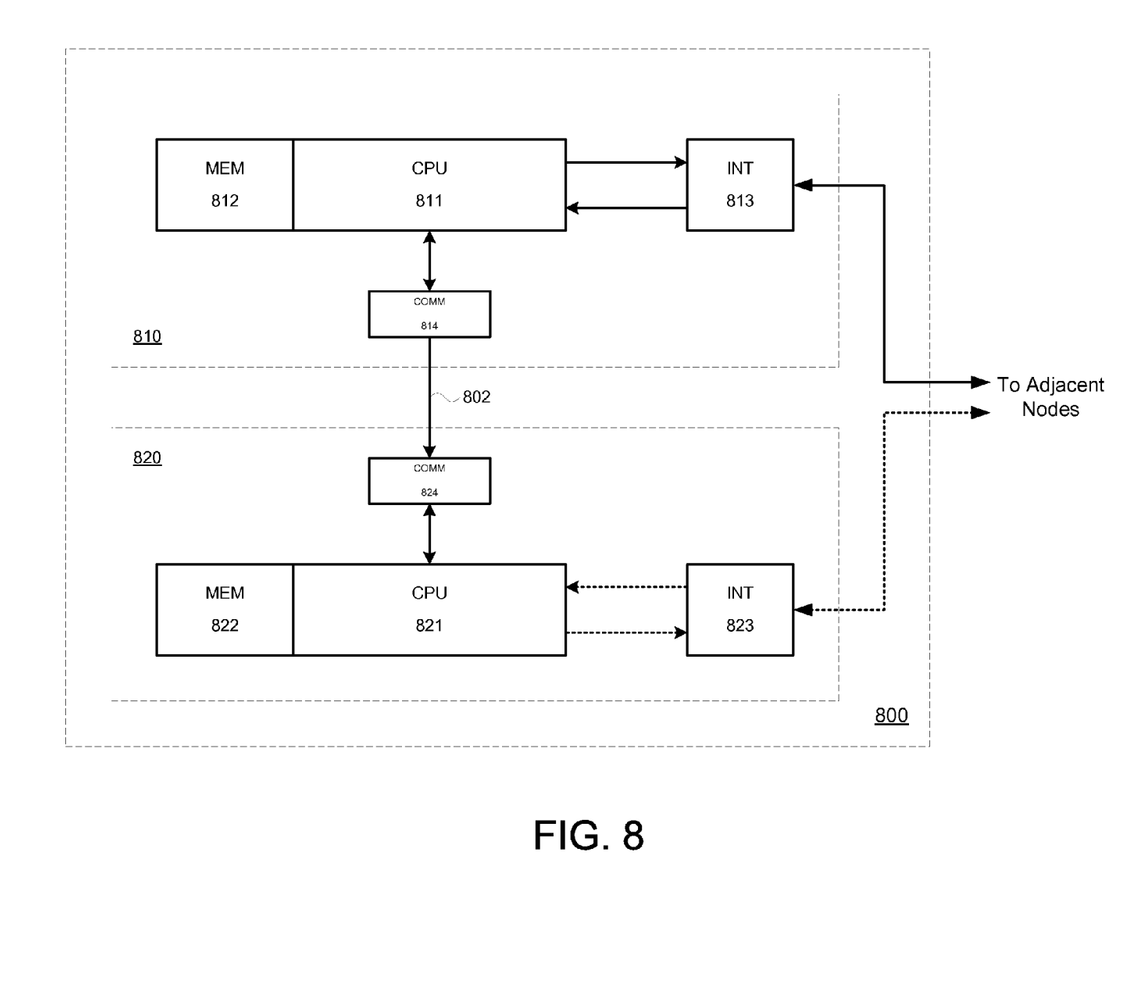
FIG. 8 illustrates a network interface device according to an embodiment.

FIG. 8 illustrates a network interface device 800 according to an alternative embodiment, which may be used to implement the functionality described above, in reference to FIG. 3. The network interface device 800 includes an active interface card 810 and a standby interface card 820 coupled via a communication link 802. According to an embodiment, the communication link 802 is a standard unidirectional Ethernet cable, thus minimizing hardware overhead for the network interface device 800. According to an alternative embodiment, the communication link 802 may be a bi-directional Ethernet cable, allowing for a failed active card to be easily replaced with a new standby card.

The active interface card 810 is made up of a CPU 811, a memory unit 812, an interface circuit 813, and a communication circuit 814 which acts as an interface between the communication link 802 and the active card 810. The interface circuit 823 is coupled to a network, for enabling communication of RSVP-TE (e.g., PATH and RESV) requests between the network interface device 800 and one or more adjacent nodes within the network. RSVP-TE requests received at the interface circuit 813 are subsequently passed on to the CPU 811 for processing.

The CPU 811 may copy any incoming and outgoing RSVP-TE requests to the CPU 821 (e.g., via the communication channel, made up of elements 814, 802, and 824) for additional processing. In an embodiment, the CPU 811 selectively copies RSVP-TE requests to the CPU 821. In other words, the CPU 811 may actively filter the RSVP-TE requests to be received by the CPU 821. For example, if the CPU 811 receives a first PATH request (e.g., prior to establishing a path state) which it is unable to process, it may simply return a PATH error message to the adjacent node from which the PATH request was received, without copying the request (either the PATH request or the PATH error) to the CPU 821. This way, the CPU 821 may consume less processing power, while still maintaining the same (e.g., none) dynamic session information as the CPU 811. In another example, the CPU 811 may choose not to copy any RSVP-TE messages that would result (or have already resulted) in a failure within the active card 810, as doing so may render the entire network interface device 800 inoperable.

In an alternative embodiment, the CPU 811 may copy all of its information to the CPU 821, including error conditions detected internally by the CPU 811 and error conditions received from external packets. For example, it may be desirable to provide the CPU 821 with all of the same (or at least substantially similar) information within the CPU 811, in order to enable the CPU 821 to make identical (or at least substantially similar) decisions with regard to the processing of RSVP-TE requests. The copying of received RSVP-TE requests, from one or more adjacent nodes, may either be performed passively (e.g., before the CPU 811 processes the incoming requests, as described above in reference to FIG. 4) or actively (e.g., after the CPU 811 processes in the incoming requests).

The memory unit 812 is provided for storing the dynamic session information processed by the CPU 811, and for maintaining a soft state of the network interface device 800. For example, the memory unit 812 may consist of one or more dynamic random access memory (DRAM) devices. However, other types of memory or storage circuits may be used in alternative embodiments.

The standby interface card 820 is made up of a CPU 821, a memory unit 822, an interface circuit 823, and a communication circuit 824 which acts as an interface between the communication link 802 and the standby card 820. The interface circuit 823 is coupled to the network, for enabling communication of RSVP-TE (e.g., PATH and RESV) requests between the network interface device 800 and one or more adjacent nodes within the network. However, according to an embodiment, the physical layer of the communication links between the interface circuit 823 and one or more adjacent nodes is disabled, as long as the active card 810 operates normally. Thus, the CPU 821 receives only the RSVP-TE requests that are copied over by the CPU 811, via the communication link 802.

According to an embodiment, the CPU 821 may receive a copy of the RSVP-TE requests before they are processed within the CPU 811 (e.g., the CPU 811 does not filter the requests to be copied to the CPU 821), and may thus operate concurrently with the CPU 811 in processing incoming RSVP-TE requests received from one or more adjacent nodes. In this manner, the CPU 821 is able to construct (or reconstruct) a soft state of the network interface device 800 based on the same RSVP-TE requests received by the CPU 811. According to another embodiment, the CPU 821 may receive a copy of the RSVP-TE requests only after they have been processed by the CPU 811 (e.g., the CPU 811 actively filters the requests to be copied to the CPU 821). However, even in this manner, the CPU 821 may still maintain, concurrently, an exact copy (or at least a substantially similar copy) of the dynamic session states maintained by the counterpart CPU 811.

The memory unit 822 is provided for storing the dynamic session information processed by the CPU 821, and for use in maintaining a soft state of the network interface device 800. For example, the memory unit 822 may be made up of a plurality of dynamic random access memory (DRAM) cells. However, other types of memory or storage circuits may be used in alternative embodiments. Further to the dynamic session information indicated above, the memory unit 822 may also store the same static information (e.g., persistent database information) as the memory unit 812. Examples of such static information may include, but are not limited to: routing or forwarding tables, port assignments, provisioning information, and/or network management information.

It should be noted that the active interface card 810 and the standby interface card 820 may be identical, according to an embodiment. Thus, designation of the active card 810 and the standby card 820 may depend upon a direction of the communication link 802 (e.g., assuming a unidirectional communication link), as is described above in reference to FIG. 4.

It should also be noted that, although only the active card 810 and the standby card 820 are illustrated in FIG. 4, in other embodiments, the network interface device 800 may include additional components and/or circuitry for performing alternative tasks not shown (e.g., traffic policing, forwarding of data packets, etc.).

Figure 5:
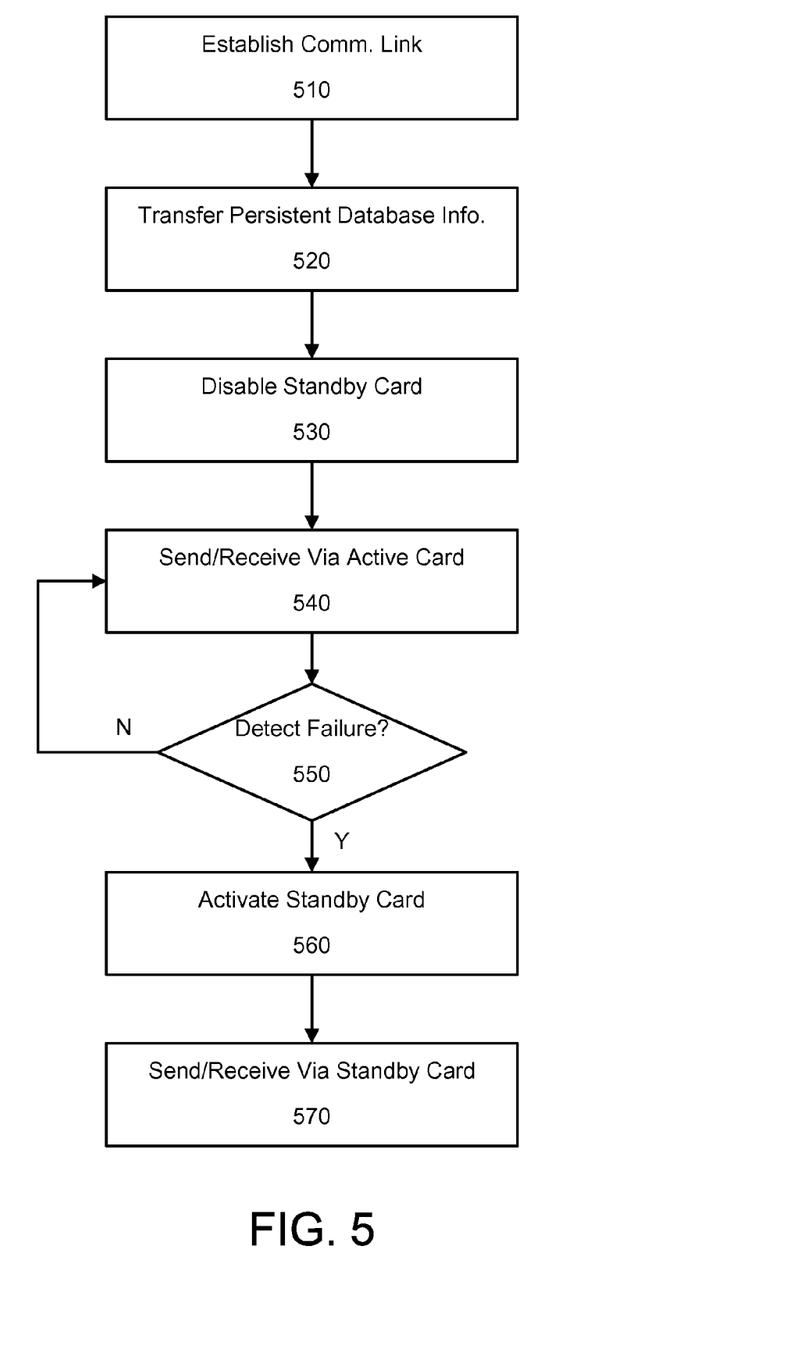
FIG. 5 illustrates an operation of a network interface device according to an embodiment.

FIG. 5 illustrates an operation of a network interface device according to an embodiment. At 510, a communication link is established between an active interface card and a standby interface card. According to an embodiment, the communication link is a unidirectional IP-layer communication link, thus enabling the transfer of RSVP-TE requests from the active card to the standby card. For example, this may involve the act of coupling (or "connecting") a communication link (e.g., an Ethernet bus or cable) between the active card and the standby card. At 520, persistent database information stored within the active card is thus transferred to the standby card. For example, the persistent database information may include, but is not limited to: network management information, lookup/forwarding tables, and/or any other static information necessary for handling RSVP-TE requests. This allows the standby card to mimic a function of the active card in communicating RSVP-TE requests so that the network interface device (e.g., the node) may seamlessly continue to process RSVP-TE requests in the event of a failure in the active card. At 530 the standby card is disabled from communicating directly with one or more adjacent nodes in the network. According to an embodiment, the physical layer of the communication links between the standby card and one or more adjacent nodes is disabled (e.g., electrically decoupled or tri-stated) during this interval.

At 540 the active card begins sending and receiving RSVP-TE requests to one or more adjacent nodes within the network, and continues to do so for as long no failure is detected at 550. During this time, the standby card receives a copy of all RSVP-TE requests sent from and received by the active card, thus maintaining an identical, or at least substantially similar, soft state of the network interface device within its own internal memory. If a failure is detected within the active card (e.g., preventing the active card from sending and/or receiving RSVP-TE requests to one or more adjacent nodes), the standby card is activated, at 560, and thus allowed to interface with the one or more adjacent nodes within the network, at 570, for example by sending and receiving RSVP-TE requests directly with the one or more adjacent nodes within the network. It should be noted that the standby card is able to immediately and seamlessly adapt to the operations of the active card, because it continuously updates an internally-stored soft state of the network interface device based on the RSVP-TE requests sent and received by the active card. This is in contrast to the prior art embodiment, described above in reference to FIG. 3, wherein the standby card typically needs time to reconstruct the entire soft state of the active card (stored in shared memory) after a fault is detected within the active card. Thus, a worst case response latency of the network interface device is reduced.

Figure 6:
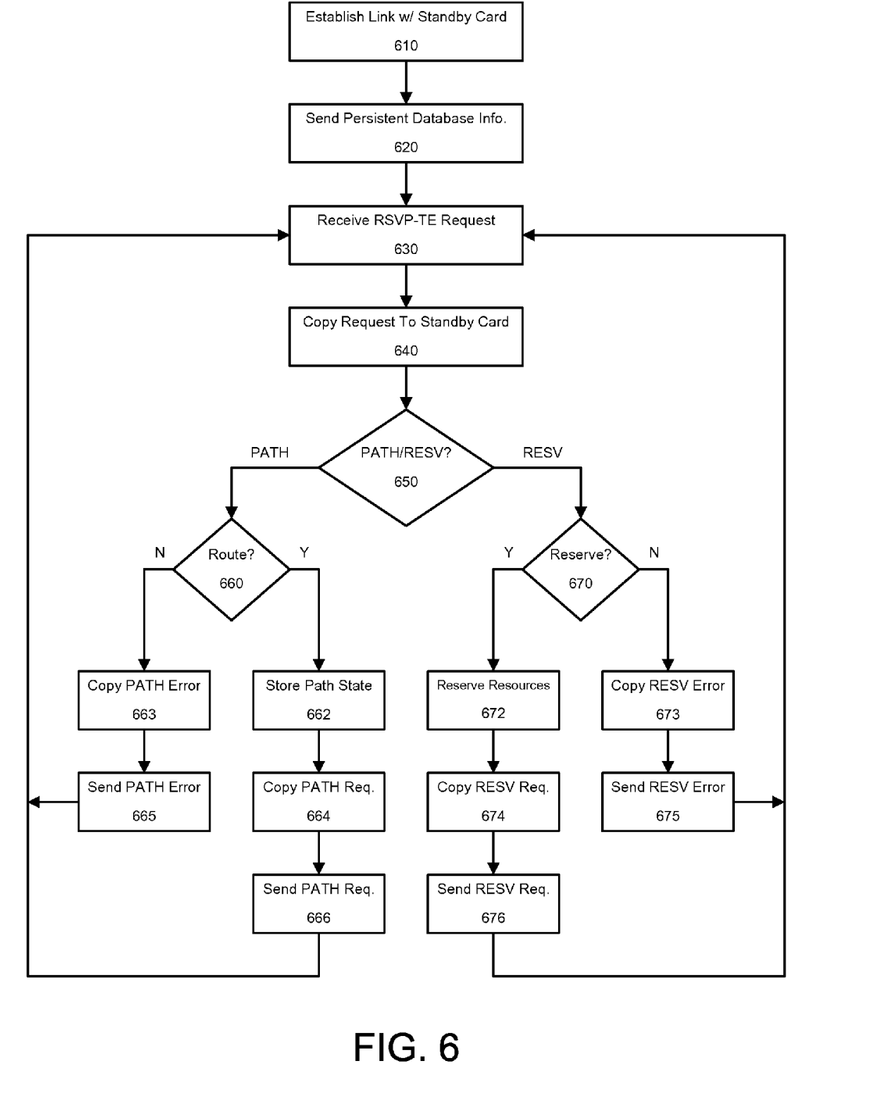
FIG. 6 illustrates an operation of an active card according to an embodiment.

FIG. 6 illustrates an operation of an active interface card according to an embodiment. At 610 a communication link is established with a standby interface card. According to an embodiment, the communication link is a unidirectional IP-layer communication link, thus enabling the transfer of RSVP-TE requests from the active card to the standby card. Then at 620, a copy of the persistent database information stored within the active card is transferred to the standby card. According to an embodiment, the persistent database information may include any static information maintained by the active card that is unique to the particular network interface device and necessary for the processing and transfer of RSVP-TE requests. Examples of such persistent database information may include, but are not limited to: provisioning information, network management information, and/or forwarding tables. At 630 the active card begins receiving RSVP-TE requests from one or more adjacent nodes within the network, and at 640 the active card sends a copy of the received RSVP-TE requests to the standby card. It should be noted that the received RSVP-TE requests may be copied to the standby card before they are actually interpreted within the active card, thus allowing the standby card to update its dynamic session state information concurrently with like updates within the active card. At 650, the active card determines whether the received RSVP-TE request is a PATH request or a RESV request, and processes the request accordingly.

For example, if the received RSVP-TE request is a PATH request, the active card then determines whether or not it is able to route the PATH request to its destination address, at 660. This determination may be performed by consulting a forwarding table stored within its internal memory. If the active card is unable to locate a path to the destination address, then at 663 it sends a copy of a PATH error message to the standby card, and at 665 the active card outputs the PATH error message to the respective node from which the PATH request was received (e.g., the previous node along the data path, from source to destination). On the other hand, if the active card is able to route the PATH request to its destination it then updates a corresponding dynamic session parameter, by storing a path state, within an internal memory, based on the received PATH request, at 662. Then at 664 the active card sends a copy of an output PATH request to the standby card, and at 666 the active card outputs (e.g., routes) the PATH request to the next adjacent node along the data path (e.g., from source to destination). It is important to note that, according to an embodiment, the active card copies all outgoing PATH messages (e.g., PATH requests and PATH errors) to the standby card before they are actually sent to the adjacent node(s).

If the received RSVP-TE request is a RESV request, the active card then determines whether or not it is able to reserve the requested resources, at 670. For example, this determination may depend on the availability of the requested resources and/or the priority of the request (e.g., relative to one or more other processes performed by the active card). If the active card is unable to reserve the requested resources, then at 632 it sends a copy of a RESV error message to the standby card, and at 675 the active card outputs the RESV error message to the respective node from which the RESV request was received (e.g., the next node along the data path, from source to destination). On the other hand, if the active card is able to reserve the requested resources, it then proceeds by performing the specified reservation at 672. According to an embodiment, the active card may also update its dynamic session information (e.g., soft state) by storing the reservation state, within an internal memory, based on the received RESV request, at 672. Then at 674 the active card sends a copy of a RESV request to the standby card, and at 676 the active card outputs the RESV request to the previous adjacent node along the data path (e.g., based on a stored path state). It is important to note that, according to an embodiment, the active card may copy all outgoing RESV messages (e.g., RESV requests and RESV errors) to the standby card before they are actually sent to the adjacent node(s).

In an embodiment, the active card may tear down its soft state if it does not receive a refresh request from an adjacent node within a predetermined data session timeout interval. Furthermore, the active card may tear down its soft state at any time in response to receiving a specific "tear-down" instruction from an adjacent node. According to another embodiment, such tear down requests are also copied to the standby card.

Figure 7:
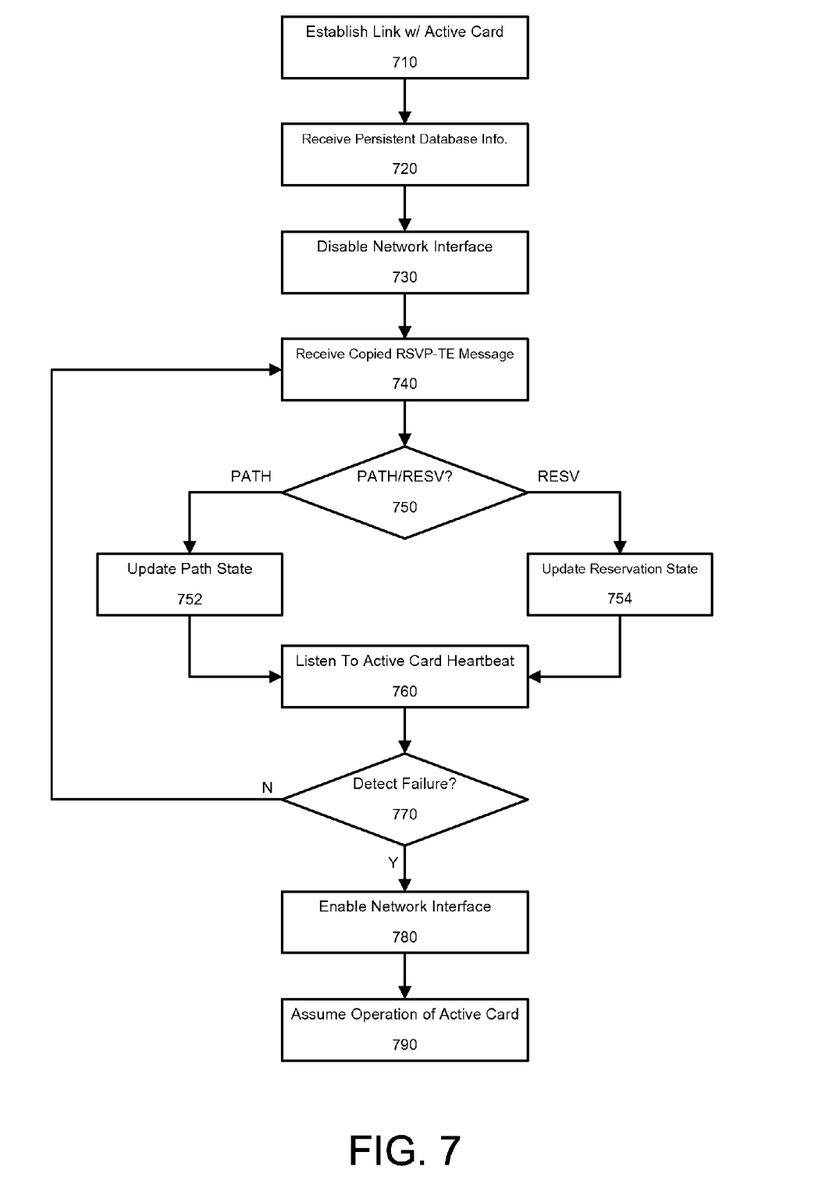
FIG. 7 illustrates an operation of a standby card according to an embodiment.

FIG. 7 illustrates an operation of a standby interface card according to an embodiment. At 710 a communication link is established with an active interface card. For example, this may involve coupling the standby card with the active card, or physically "plugging in" the standby card to the network interface device. According to an embodiment, the communication link is a unidirectional IP-layer communication link, thus enabling the standby card to receive copies of RSVP-TE requests sent and received by the active card. Then at 720, the standby card receives a copy of the persistent database information stored within the active card. According to an embodiment, the persistent database information includes any static information that is unique to the particular network interface device (e.g., node) and necessary for the processing and transfer of RSVP-TE requests. Examples of such persistent database information may include, but are not limited to: provisioning information, network management information, and/or forwarding tables. At 730, the standby card is disabled from interfacing directly with network. According to an embodiment, the physical layer of the communication links between the standby card and one or more adjacent nodes is disabled (e.g., electrically decoupled) in this operation.

At 740, the standby card begins receiving copied RSVP-TE messages from the active card. Examples of such RSVP-TE messages may include, but are not limited to: incoming PATH and RESV requests, outgoing PATH and RESV requests, and/or outgoing PATH and RESV error messages. At 750, the standby card determines whether the received RSVP-TE message is a PATH message or a RESV message and then updates internally-stored dynamic session state information, accordingly. For example, the standby card may store an updated path state, at 752, if the RSVP-TE message is a PATH request (either sent or received by the active card). On the other hand, the standby card may tear down its path state, at 752, if the RSVP-TE message is a PATH error message (e.g., output by the active card). Similarly, the standby card may store an updated reservation state, at 754, if the RSVP-TE message is a RESV request. The standby card may also tear down its reservation state, at 754, if the RSVP-TE message is a RESV error message. According to an embodiment, the standby card checks its own internally-stored dynamic session information against the PATH and RESV requests output by the active card, to ensure that an identical (or at least substantially equivalent) soft state is maintained, concurrently, by both the active card and the standby card.

At 760, the standby card listens for a "heartbeat" of the active card, and makes a subsequent determination as to whether or not a failure has occurred within the active card, at 770. According to an embodiment, the heartbeat may be a reliable hardware (or software) pulse, or other type of signal, that is emitted by the active card at periodic intervals while it assumes normal operation. Thus, as long as the standby card detects a pulse within a dynamic session timeout interval, it assumes that the active card is still alive, and thus continues to receive copies of RSVP-TE messages from the active card, at 740. On the other hand, if the standby card does not detect a pulse within the dynamic session timeout interval, it assumes that the active card has died, and thus proceeds by enabling its own network interface connections, at 780 (e.g., restoring the electrical connections that were decoupled at 730). In an embodiment, the dynamic session timeout interval is sufficiently smaller than the data session timeout interval, thus allowing the standby card to detect a failure within the active card and to assume the operation of the active card (e.g., output a refresh request to one or more adjacent nodes) before the data session timeout interval expires. Typically, at 790, the standby card already has a copy of all the relevant dynamic session information maintained on the active card and is thus able to immediately, and seamlessly, take over the operations of the active card, as described above in reference to FIG. 6. It should be noted that, in an embodiment, the standby card does not communicate back to the active card, and thus operates typically with the exclusion of steps 610, 620, 663, 664, 673, and 674 of FIG. 6. In alternative embodiments, however, the current standby card may assume all the operations described in FIG. 6, including copying to a standby card, thus allowing the dead active card to be replaced with a new standby card (e.g., by reversing the direction of the unidirectional communication link or by establishing a bidirectional communication link, at 710, between the active card and the standby card). It should also be noted that, between 770 and 790 the network interface device, as a whole, continues to send and receive RSVP-TE requests without any noticeable disruption perceived by its adjacent nodes.

It should be noted that the standby card may additionally receive RSVP-TE requests, at 740, in the form of periodic refresh requests. This (in conjunction with the loosely coupled embodiment of FIGS. 3 and 4) enables the standby card to be connected, or plugged in, to the network interface device at any time during a normal operation of the active card, without any loss in functionality. In other words, the standby card is able to reconstruct the dynamic session information stored in the active card, even after a data session has been established, by intercepting the refresh requests sent and received by the active card. In an embodiment, the standby card may tear down its soft state if it does not receive a refresh request within a predetermined data session timeout interval. Additionally, the standby card may tear down its soft state at any time in response to receiving a specific "tear-down" instruction from an adjacent node.

It should be noted that the various interface cards, circuit components, dice and packages disclosed herein may be described using computer aided design tools and expressed (or represented), as data and/or instructions embodied in various non-transitory computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Non-transitory computer-readable media in which such formatted data and/or instructions may be embodied include, but are not limited to, non-volatile storage media in various forms (e.g., optical, magnetic or semiconductor storage media) that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

When received within a computer system via one or more non-transitory computer-readable media, such data and/or instruction-based expressions of the above described interface cards, and components thereof, may be processed by a processing entity (e.g., one or more processors) within the computer system in conjunction with execution of one or more other computer programs including, without limitation, net-list generation programs, place and route programs and the like, to generate a representation or image of a physical manifestation of such interface cards or components thereof. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. In other instances, well-known circuits and devices are shown in block diagram form to avoid obscuring the present invention unnecessarily. Additionally, the interconnection between circuit elements or blocks may be shown as buses or as single signal lines. Each of the buses may alternatively be a single signal line, and each of the single signal lines may alternatively be buses. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A network interface device comprising:
a first interface card to receive a first request from a first adjacent node in a network, wherein the first request includes information for establishing a data session between two host devices in the network, the first interface card including circuitry to store a first session parameter based, at least in part, on the first request; and
a second interface card, coupled to the first interface card, to receive a second request based, at least in part, on the first request, and to store, concurrently with a storing of the first session parameter by the first interface card, a second session parameter based, at least in part, on the second request,
wherein the second interface card includes failure detection circuitry to detect a failure within the first interface card, and to selectively couple the second interface card to the first adjacent node in response to detecting a failure.

2. The network interface device of claim 1 wherein the first and second session parameters are substantially equivalent.

3. The network interface device of claim 2 wherein the first interface card comprises:
a first memory circuit for storing the first session parameter; and
a first processor to output a third request to a second adjacent node in the network based, at least in part, on the first session parameter.

4. The network interface device of claim 3 wherein the failure detection circuitry comprises circuitry to detect whether the first interface card outputs the third request to the second adjacent node within a first timeout interval.

5. The network interface device of claim 3 wherein the failure detection circuitry comprises circuitry to selectively couple the second interface card to the second adjacent node in response to detecting a failure.

6. The network interface device of claim 5 wherein the second interface card comprises:
a second memory circuit for storing the second session parameter; and
a second processor to selectively output, in response to detecting a failure, a fourth request to the second adjacent node based, at least in part, on the second session parameter.

7. The network interface device of claim 1 further comprising a communication link coupled between the first interface card and the second interface card for providing the second request from the first interface card to the second interface card.

8. The network interface device of claim 7 wherein the communication link is a unidirectional communication link.

9. The network interface device of claim 1 wherein the first request comprises at least one of a path request and a reservation request.

10. A network interface device comprising:
a first interface card having circuitry to output a first request to an adjacent node in a network, wherein the first request includes information for establishing a data session between two host devices in the network; and
a second interface card, coupled to the first interface card, to receive a second request based, at least in part, on the first request, and to update a first session parameter based, at least in part, on the second request, wherein the first session parameter is stored within the second interface card,
wherein the second interface card includes failure detection circuitry to detect a failure within the first interface card, and to selectively couple the second interface card to the first adjacent node in response to detecting a failure.

11. The network interface device of claim 10 wherein the first interface card comprises a first memory circuit to store a second session parameter based, at least in part, on the first request.

12. The network interface device of claim 11 wherein the first and second session parameters are substantially equivalent.

13. The network interface device of claim 12 wherein the second interface card comprises:
a second memory circuit for storing the first session parameter; and
a second processor to selectively output, in response to detecting a failure, a third request to the adjacent node based, at least in part, on the first session parameter.

14. The network interface device of claim 13 wherein the first request comprises at least one of a path request and a reservation request.

15. The network interface device of claim 13 wherein the first request comprises an error message.

16. The network interface device of claim 15 wherein the second processor includes circuitry to tear down the first session parameter stored in the second memory circuit, in response to the error message.

17. The network interface device of claim 10 further comprising a communication link coupled between the first interface card and the second interface card for providing the second request from the first interface card to the second interface card.

18. The network interface device of claim 17 wherein the communication link is a unidirectional communication link.

19. A method of operation within a network interface device, the method comprising:
receiving a first request from a first adjacent node in a network, wherein the first request includes information for establishing a data session between two host devices in the network;
storing, concurrently, first and second session parameters based, at least in part, on the first request;
detecting a failure within a first interface card of the network interface device; and
selectively outputting one of a first request or a second request to a second adjacent node based on whether or not a failure is detected, wherein the first request is based, at least in part, on the first session parameter and wherein the second request is based, at least in part, on the second session parameter.

20. The method of claim 19 wherein the first and second session parameters are substantially equivalent.

21. The method of claim 20 wherein storing first and second session parameters comprises:
storing the first session parameter in the first interface card; and
storing the second session parameter in a second interface card of the network interface device.

22. The method of claim 21 wherein selectively outputting one of a first request or a second request to a second adjacent node comprises selectively coupling the second interface card to the second adjacent node in response to detecting a failure in the first interface card.

23. The method of claim 22 wherein selectively outputting one of a first request or a second request to a second adjacent node further comprises:
generating the second request in response to detecting a failure; and
outputting the second request to the second adjacent node.

24. The method of claim 21 wherein selectively outputting one of a first request or a second request to a second adjacent node comprises selectively coupling the second interface card to the first adjacent node in response to detecting a failure in the first interface card.

25. The method of claim 19 wherein detecting a failure within a first interface card comprises detecting whether the first interface card outputs the second request to the second adjacent node within a first timeout interval.

26. The method of claim 25 wherein selectively outputting one of a first request or a second request to a second adjacent node comprises selectively outputting one of a first request or a second request to a second adjacent node within a second timeout interval, wherein the second timeout interval is sufficiently larger than the first timeout interval.

27. The method of claim 21 further comprising establishing a unidirectional communication from the first interface card to the second interface card.

28. The method of claim 27 wherein establishing a unidirectional communication further comprises assigning a respective role to each of the first interface card and the second interface card.

29. The method of claim 21 wherein the first request comprises at least one of a path request and a reservation request.

30. A method of operation within a network interface device, the method comprising:
    outputting a first request from a first interface card of the network interface device to an adjacent node in a network, wherein the first request includes information for establishing a data session between two host devices in the network;
    outputting a second request based, at least in part, on the first request from the first interface card to a second interface card of the network interface device;
    updating a first session parameter stored in the second interface card based, at least in part, on the second request;
    detecting a failure within the first interface card of the network interface device; and
    selectively coupling one of the first interface card or the second interface card to the adjacent node based on whether or not a failure is detected.

31. The method of claim 30 wherein outputting a first request from a first interface card comprises storing a second session parameter in the first interface card based, at least in part, on the first request.

32. The method of claim 31 wherein the first and second session parameters are substantially equivalent.

33. The method of claim 32 wherein selectively coupling one of the first interface card or the second interface card to the adjacent node comprises coupling the second interface card to the second adjacent node in response to detecting a failure in the first interface card.

34. The method of claim 33 wherein coupling the second interface card to the second adjacent node further comprises:
    generating a third request based, at least in part, on the first session parameter in response to detecting a failure in the first interface card; and
    outputting the third request to the second adjacent node.

35. The method of claim 34 wherein the first request comprises an error message.

36. The method of claim 35 wherein updating a first session parameter comprises tearing down the first session parameter in response to the error message.

37. The method of claim 30 wherein detecting a failure within the first interface card comprises detecting whether the first interface card outputs the first request within a first timeout interval.

38. The method of claim 30 further comprising establishing a communication link between the first interface card and the second interface card.

39. The method of claim 38 wherein establishing a communication link further comprises establishing a unidirectional communication from the first interface card to the second interface card.

40. The method of claim 39 wherein establishing a unidirectional communication further comprises assigning a respective role to each of the first interface card and the second interface card.

41. A network interface device comprising:
    means for receiving a first request from a first adjacent node in a network, wherein the first request includes information for establishing a data session between two host devices in the network;
    means for storing, concurrently, first and second session parameters based, at least in part, on the first request;
    means for detecting a failure within a first interface card of the network interface device; and
    means for selectively outputting one of a first request or a second request to a second adjacent node based on whether or not a failure is detected, wherein the first request is based, at least in part, on the first session parameter and wherein the second request is based, at least in part, on the second session parameter.

42. A non-transitory computer-readable media having information embodied therein that includes a description of an integrated-circuit memory device, the information including descriptions of:
    a first interface card to receive a first request from a first adjacent node in a network, wherein the first request includes information for establishing a data session between two host devices in the network, the first interface card including circuitry to store a first session parameter based, at least in part, on the first request; and
    a second interface card, coupled to the first interface card, to receive a second request based, at least in part, on the first request, and to store, concurrently with a storing of the first session parameter by the first interface card, a second session parameter based, at least in part, on the second request,
    wherein the second interface card includes failure detection circuitry to detect a failure within the first interface card, and to selectively couple the second interface card to the first adjacent node in response to detecting a failure.

* * * * *